W. SPEAR.
GRINDING-MILLS.

No. 194,540. Patented Aug. 28, 1877.

Attest
W. S. Baker
L. M. Harris

Inventor
Warren Spear
By Coburn Thacher
Attorneys

W. SPEAR.
GRINDING-MILLS.

No. 194,540. Patented Aug. 28, 1877.

Attest
W. S. Baker
L. M. Harris

Inventor
Warren Spear
By Coburn & Thacher
Attorneys

UNITED STATES PATENT OFFICE.

WARREN SPEAR, OF AURORA, ILLINOIS.

IMPROVEMENT IN GRINDING-MILLS.

Specification forming part of Letters Patent No. 194,540, dated August 28, 1877; application filed August 22, 1876.

*To all whom it may concern:*

Be it known that I, WARREN SPEAR, of Aurora, in the county of Kane and State of Illinois, have invented a new and useful Improvement in Grinding-Mills, which is fully described in the following specification, reference being had to the accompanying drawings, in which—

Figure 1:
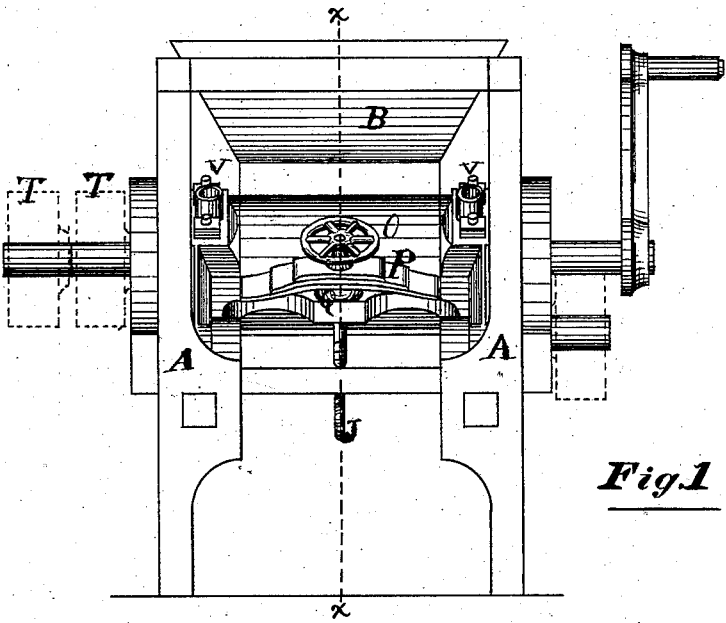
Figure 2:
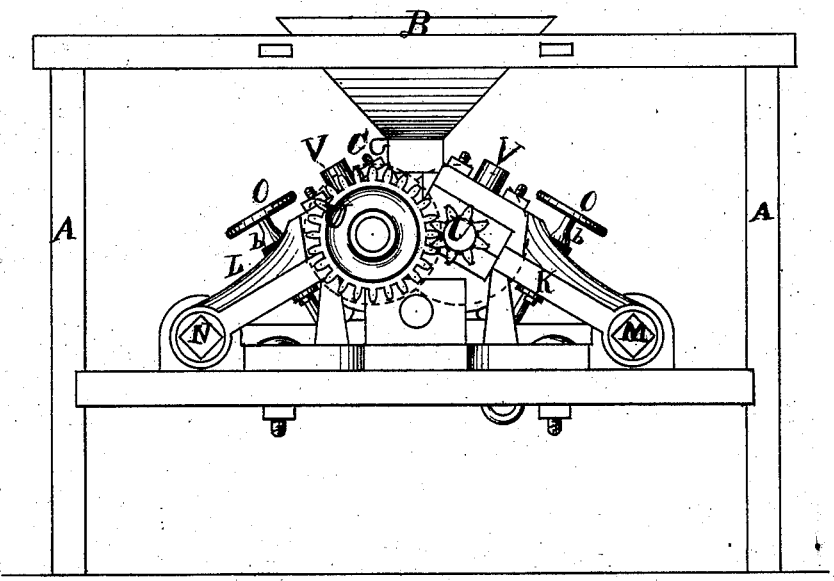
Figure 3:
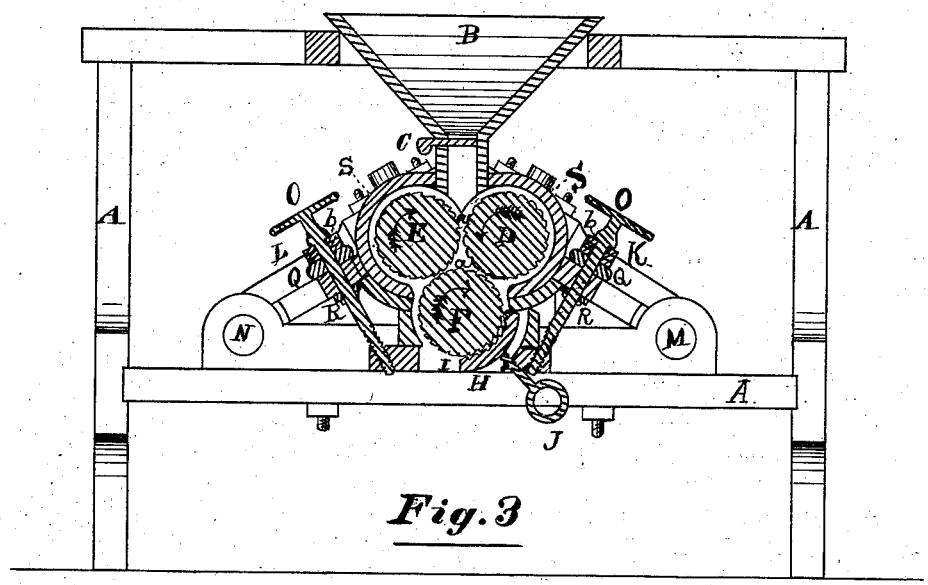
Figure 4:
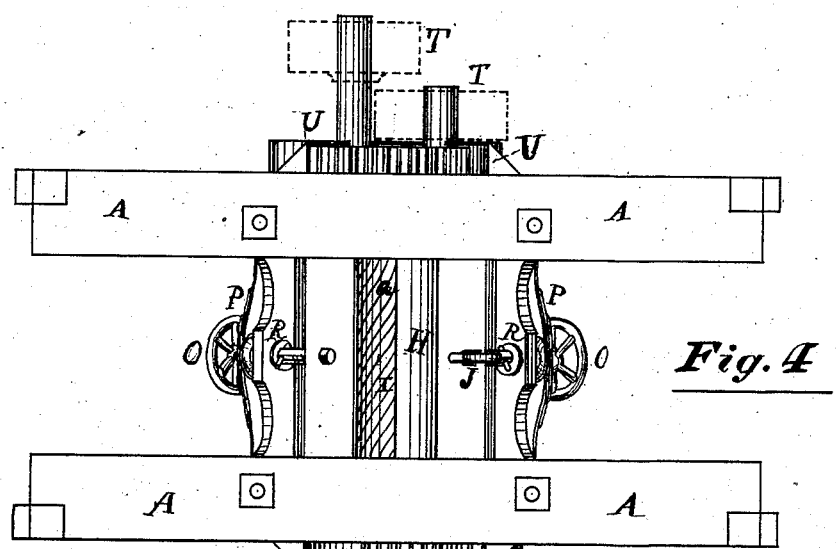

Figure 1 is a side elevation of my grinding-machine; Fig. 2, an end elevation of the same; Fig. 3, a transverse vertical section taken on the line $x\ x$, Fig. 1; and Fig. 4 a plan view of the bottom thereof.

The object of my invention is more especially to make a mill for grinding corn and oats for feed. I have aimed to make a grinding-mill that will grind rapidly and well, and, at the same time, be easy of adjustment and simple and cheap in construction.

My invention consists in grinding-cylinders with diagonal drifts for grinding the grain or other material, and the cylinders are so geared to each other, or so provided with driving-pulleys for driving them, that they will revolve at different speeds as the grain passes between them to be ground. I also provide one of these cylinders with an adjustable concave grinding-surface, and hang the two upper cylinders in pivoted frames or bearings, made adjustable on their pivots for the purpose of regulating the fineness of the meal ground. These pivoted bearings or frames are provided with springs, which admit of the grinding-cylinders yielding in case a hard substance passes between them.

In the accompanying drawings, A represents the frame of a mill. B is the hopper, at the bottom of which is a slide, C, for regulating the flow of the grain to the grinding-cylinders. D, E, and F are three grinding-cylinders. They are provided with grinding-drifts $a$. I make these drifts extending diagonally around the cylinder, as clearly shown in Fig. 4. One of the upper cylinders revolves faster than the other. I prefer to make one revolve about three times as fast as the other.

When the grain is passed between the cylinders D and E it is carried between the cylinders D and F. These also revolve at an unequal speed.

H is a concave grinding-surface, made adjustable to the cylinder F. The grinding is finished between the cylinder F and this concave grinding-surface H, and the meal is discharged through the opening I. J is a set-screw for adjusting the concave grinding-plate H. The cylinder D has its bearings in a pivoted frame, K, and the cylinder E has its bearings in the pivoted frame L. They are pivoted to the frame A at M and N, respectively. These frames are held in place by the screws O.

P P are elliptic springs, with their ends resting upon the pivoted frames. The long screws O pass through them, and the shoulders $b\ b$ rest upon the center of these springs. Q Q are rubber springs placed under the elliptic springs and on the long screws O O. R R are shoulders or lugs on the long screws O O, on which the pivoted frames L and K rest.

By turning the long screws O O the pivoted frames are vibrated on their pivots, and the grinding-cylinders are adjusted relatively to each other. In case an unusually hard substance passes between the cylinders the springs above described admit of their yielding by the frames swinging on their pivots.

S S are cylindrical casings covering the grinding-cylinders. T are driving-pulleys, by which each grinding-cylinder may be driven separately, and U represents a cog-gearing, which gears the cylinders together, so that they are all driven from one belt.

The gearing and pulleys are so constructed and arranged that the cylinders will be driven at different speeds, as above described.

V V are journal-boxes for the cylinders, constructed in the usual manner of constructing journal-boxes. The pivoted frames K and L vibrate entirely independently of each other, so that the cylinder D can be adjusted without disturbing the cylinder E.

It will be observed that by means of revolving one cylinder faster than the other the grinding partakes partially of the nature of crushing, and by using cylinders I am able to get a greater grinding-surface near the center of the cylinder or point of applying the power. I thereby get a greater grinding capacity.

While I contemplate applying my mill more especially to the grinding of feed, I may make the drifts of such a character as to adapt it to grinding coarse or fine, and I am convinced that I can even apply it to grinding wheat into flour, and make a better quality than is made by the present process of grinding, with less power than is now required.

Having thus described the construction and operation of my invention, what I claim as new, and desire to secure by Letters Patent, is—

1. The three grinding-cylinders D E F, arranged and adjusted to form two grinding-surfaces, in combination with a concave, H, adjusted to form a third grinding-surface with one of the cylinders, substantially as described.

2. The grinding-cylinders D and E, in combination with one or more pivoted adjustable frames, K L, substantially as and for the purpose set forth.

3. The pivoted adjustable frames K L, in combination with the springs P Q, and the grinding-cylinders D E, substantially as and for the purpose set forth.

WARREN SPEAR.

Witnesses:
L. M. HARRIS,
H. H. TALCOTT.